United States Patent [19]

Kobayashi

[11] Patent Number: 4,713,965

[45] Date of Patent: Dec. 22, 1987

[54] METHOD AND SYSTEM FOR DETECTING FUEL INJECTION TIMING IN A DIESEL ENGINE

[75] Inventor: Fumiaki Kobayashi, Toyota, Japan

[73] Assignee: Toyota Jidosha Kabushiki Kaisha, Japan

[21] Appl. No.: 882,380

[22] Filed: Jul. 7, 1986

[30] Foreign Application Priority Data

Jul. 8, 1985 [JP] Japan ............................ 60-149498

[51] Int. Cl.[4] ........................................... G01M 15/00
[52] U.S. Cl. .................................................. 73/119 A
[58] Field of Search ........................ 73/119 A, 117.3; 123/617, 494

[56] References Cited

U.S. PATENT DOCUMENTS 4,295,363 10/1981 Buck et al. ......................... 73/117.3
4,369,651 1/1983 Szentes ............................. 73/119 A

*Primary Examiner*—Jerry W. Myracle
*Attorney, Agent, or Firm*—Parkhurst & Oliff

[57] ABSTRACT

In detecting a fuel injection timing in a diesel engine, a crank angle reference position is detected from rotation of a member rotatable in association with rotation of the engine, said member being disposed outside a fuel injection pump. While, in the fuel injection pump, a predetermined pump angle is detected from rotation of a member for converting rotary motion of a pump driving shaft into reciprocatory motion of a fuel pressure-feed plunger relative to the pump driving shaft, whereby the fuel injection timing is determined from a phase difference between the crank angle reference position and the predetermined pump angle. With this arrangement, the fuel injection pump can be assembled onto the engine without accurate measuring and an accuracy in detecting the fuel injection timing equal to or exceeding that in the conventional case can be obtained by more simplified adjustment than in the conventional case or with no adjustment.

16 Claims, 14 Drawing Figures

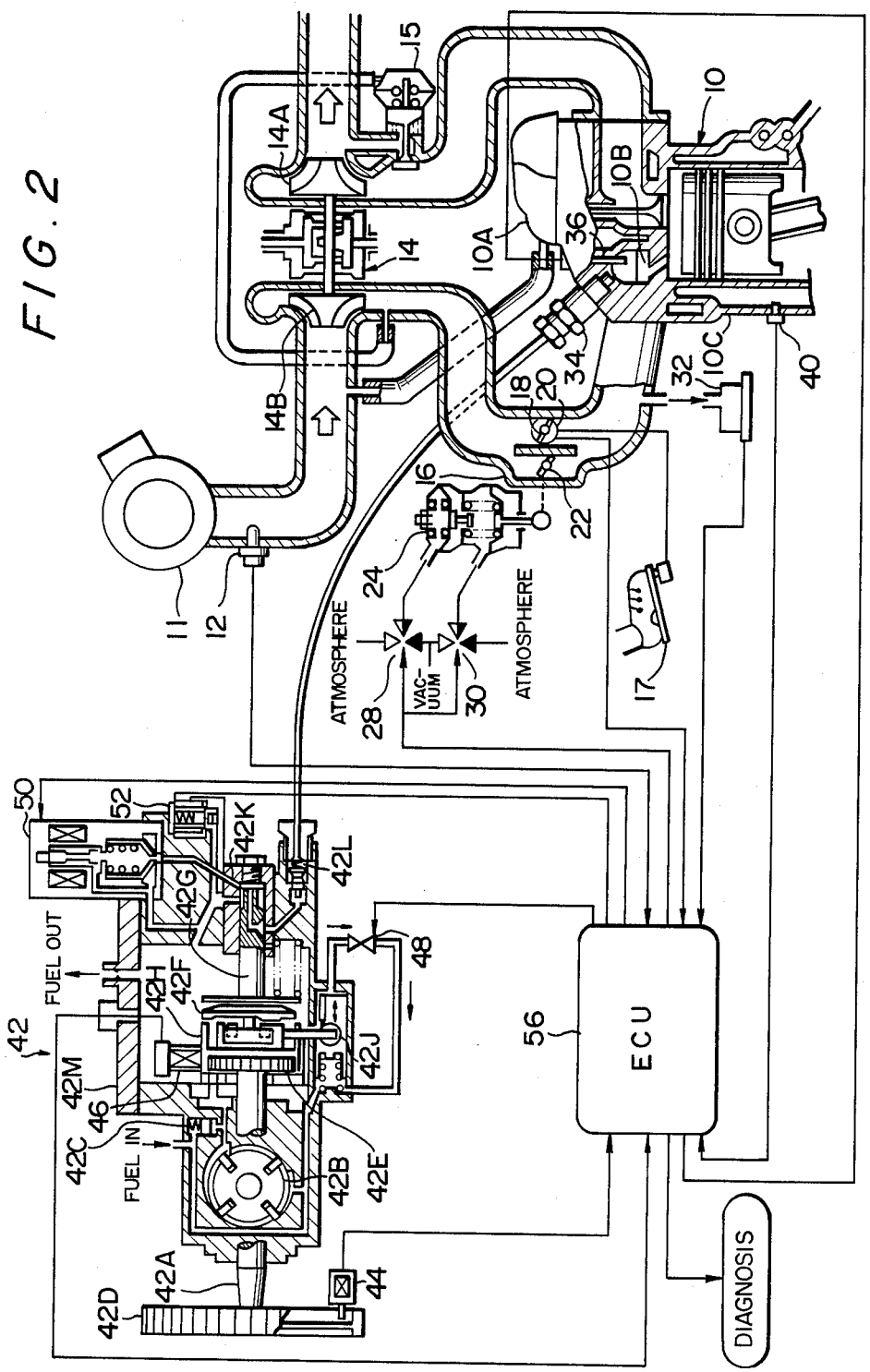

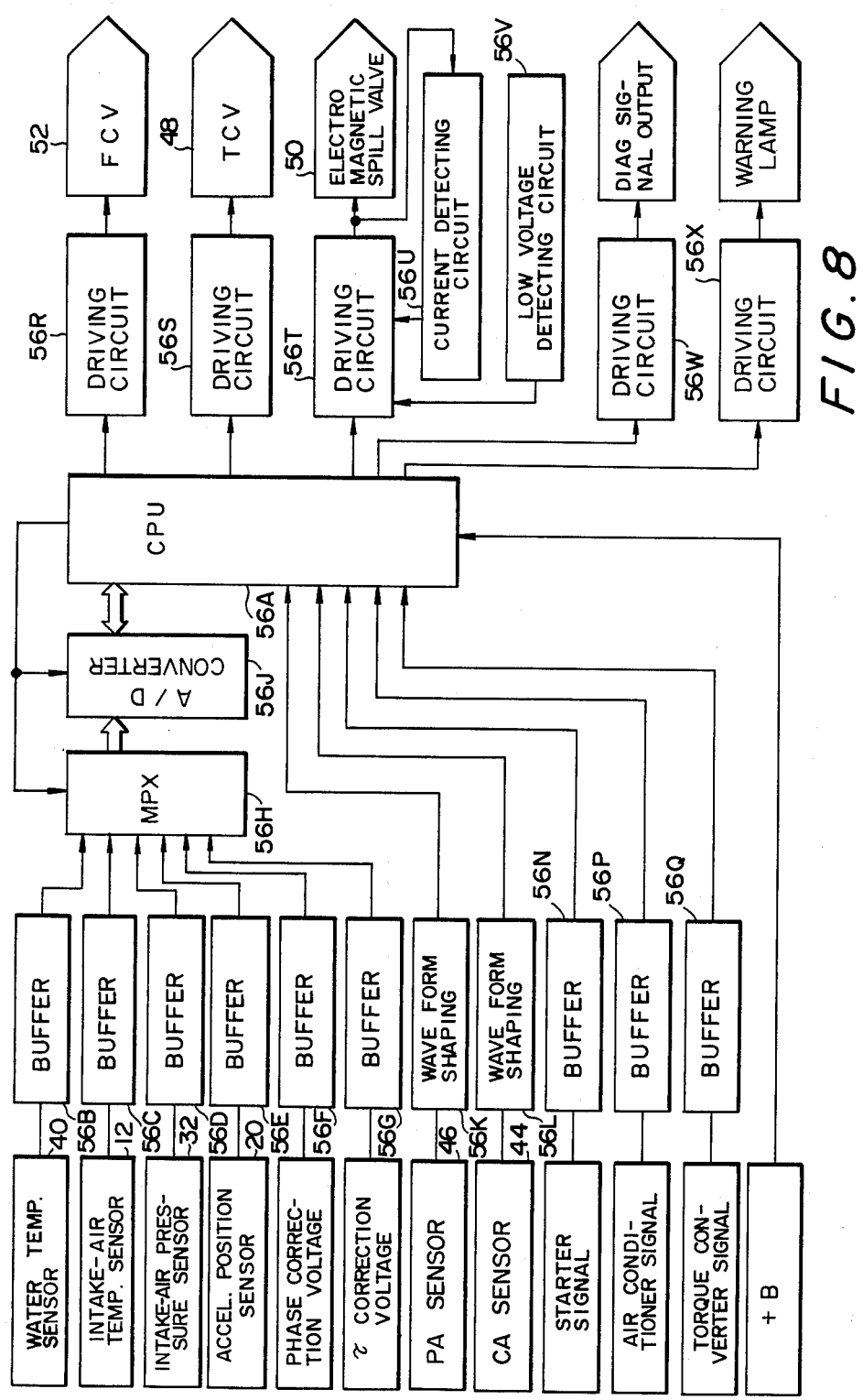

METHOD AND SYSTEM FOR DETECTING FUEL INJECTION TIMING IN A DIESEL ENGINE

BACKGROUND OF THE INVENTION

This invention relates to a method and a system for detecting fuel injection timing in a diesel engine, and more particularly to improvements in a method and a system for detecting fuel injection timing in a diesel engine, for use controlling fuel injection in a diesel engine having an electromagnetic spill type distribution fuel injection pump, wherein a member for converting rotary motion of a pump driving shaft into reciprocatory motion of a fuel pressure-feed plunger is provided, and the converting member is rotated relative to the driving shaft to vary a starting phase of a compression stroke of the fuel pressure-feed plunger, to thereby control the fuel injection timing.

In the past, electromagnetic spill type distribution fuel injection pumps have been used for precisely controlling the fuel injection quantity supplied to a diesel engine. In the electromagnetic spill type distribution fuel injection pump, a high pressure chamber defined by a forward end surface of a plunger and an inner wall surface of a cylinder is communicated with a low pressure chamber in a pump housing. An electromagnetic valve (referred to as an "electromagnetic spill valve") is provided for blocking and opening the path between the high and low pressure chambers. The electromagnetic spill valve is on-off operated to control the fuel injection quantity. More specifically, the communicating path is blocked by the electromagnetic spill valve before the plunger is lifted in a direction of reducing the volume of the high pressure chamber. When the plunger is lifted and a preset quantity of fuel has been injected, the communicating path is opened by the electromagnetic spill valve to stop the fuel injection.

Detection of the fuel injection timing in distribution type fuel injection pump of this type may be performed by methods proposed by the applicant in Japanese Utility Model Laid-Open (Kokai) No. 164224/1983 and Patent Laid-Open (Kokai) No. 192842/1984, for example.

As shown in FIG. 13, an injection timing detecting device of the distribution type fuel injection pump proposed in Utility Model Laid-Open (Kokai) No. 164224/1983, includes a rotor 42E having teeth disposed on the outer periphery thereof for emitting pulses. The rotor 42E has missing teeth corresponding in number to the number of engine cylinders. A pickup 8 (hereinafter referred to as a "CA pickup") for detecting a crank angle reference position based upon the approach of one of the missing teeth is provided near the outer periphery of the rotor 42E at the inner side of a pump housing 42M. A pickup 9 for detecting the start of fuel injection from the approach of the missing tooth is provided near the outer periphery of the rotor 42E on a roller ring 42H used to convert rotary motion of the pump driving shaft 42A into reciprocating motion of the fuel pressure-feed plunger 42G. Thus, an advance angle at the injection timing is detected on the basis of a phase difference between an output from the CA pickup 8 and the pickup 9 for detecting the start of injection.

In the distribution type fuel injection pump for a diesel engine, proposed in Patent Laid-Open (Kokai) No. 192842/1984, rotation of the rotor (42E) provided on the pump driving shaft (42A) of the fuel injection pump (42) is detected by a pickup (8) provided on the pump housing (42M) so as to detect a crank angle reference position. Thus, the fuel injection timing can be detected from the crank angle reference position and an output from a timer piston position detector for directly detecting the position of a timer piston (42J). Furthermore, in another arrangement, the provision of a pickup on the roller ring (42H) makes it possible to directly detect the relative rotational angle between the roller ring and the pump driving shaft.

In all of the above conventional arrangements the crank angle reference position sensor (hereinafter referred to as a "CA sensor") has been provided in the fuel injection pump 42. Thus, unless the fuel injection pump 42 is accurately mounted relative to a crank angle reference of the engine, the actual injection timing goes out of order. Moreover, in practice, it is extremely difficult to accurately assemble the fuel injection pump 42 relative to the engine crank angle reference. The assembling should be performed with the movement (or lift amount) of the pump plunger 42G being measured with a micrometer or the like, thus increasing costs.

SUMMARY OF THE INVENTION

The present invention was developed to obviate the above described disadvantages and drawbacks of the conventional arrangements. Accordingly, it is an object of the present invention to provide a method and a system for detecting fuel injection timing in a diesel engine, wherein the fuel injection pump can be assembled onto the engine without performing accurate measuring, while retaining an accuracy in detecting the fuel injection timing which equals or exceeds that of conventional arrangements by performing adjustment more simplified than is conventional or with no adjustment.

To achieve the above-described object, the present invention contemplates a method of detecting fuel injection timing in a diesel engine having a fuel injection pump, wherein a member for converting rotary motion of a pump driving shaft into reciprocatory motion of a fuel pressure-feed plunger, is rotated relative to the pump driving shaft to vary the starting position of the compression stroke of the fuel pressure-feed plunger so as to control fuel injection timing. The contemplated method includes the steps of: detecting a crank angle reference position based upon rotation of a member disposed outside the fuel injection pump which is rotatable in association with rotation of the engine; detecting a predetermined pump angle from rotation of the converting member relative to the pump driving shaft, in the fuel injection pump; and determining a fuel injection timing from the phase difference between the crank angle reference position and the predetermined pump angle.

To achieve the above-described object, the present invention contemplates a system for detecting fuel injection timing in a diesel engine, the outline of which is shown in FIG. 1. The system includes: a pulser (44A) provided on a member (42D) rotatable in association with the engine rotation and disposed outside the fuel injection pump (42), for producing a crank angle reference position signal; a pickup (44B) for producing a crank angle reference position signal based on the approach of the pulser; a pulser (42E) for producing a pump angle signal, provided on a member rotatable in association with the pump driving shaft (42A) in the fuel injection pump; and a pickup (46B) for producing at least a predetermined pump angle signal from the approach of a predetermined position on the pulser for producing a pump angle signal provided on a member (42H) for converting rotary motion of the pump driving shaft into reciprocating motion of a fuel pressure-feed plunger (42G), in the fuel injection pump. With this system the fuel injection timing can be determined from a phase difference between the crank angle reference position signal and the predetermined pump angle signal.

In a specific form of the present invention, the pulser for use in producing the crank angle reference position signal is provided on the pump driving pulley which drives the fuel injection pump, and the pickup for producing the crank angle reference position signal is provided on a flange used for mounting the fuel injection pump.

In another specific form of the present invention, the pulser for use in producing the crank angle reference position signal is provided on the crankshaft, and the pickup for producing the crank angle reference position signal is provided on the cylinder block of the engine.

In a further specific form of the present invention, the pulser for use in producing the crank angle reference position signal is provided on a fly wheel, and the pickup for producing the crank angle reference position signal is provided on a back plate, a cylinder block of the engine or a housing of a transmission.

In a still further specific form of the present invention, the pulser for use producing the crank angle reference position signal is provided on a cam shaft, and the pickup for producing the crank angle reference position signal is provided on the cylinder head of the engine.

According to the present invention, in detecting the fuel injection timing in the diesel engine, a crank angle reference position is detected from rotation of a member rotatable in association with the engine rotation, outside the fuel injection pump, while, the predetermined pump angle is detected from the rotation of a member in the fuel injection pump for converting the rotary motion of the pump driving shaft into reciprocatory motion of the fuel pressure-feed plunger relative to the pump driving shaft. The fuel injection timing is determined from the phase difference between the crank angle reference position and the predetermined pump angle. Since the crank angle reference position sensor is provided separately of the main body of fuel injection pump, advance angle adjustment at the time of assembly is no longer necessary. Thus the fuel injection pump can be assembled onto the engine in a more simplified manner without accurate measuring while retaining an accuracy in detecting the fuel injection timing which equals or exceeds that of conventional arrangements. Accordingly, the process of assembling the roller ring in the fuel injection pump is facilitated, the accuracy in detecting the fuel injection timing is improved, and the timer position sensor, nozzle lift sensor, ignition timing sensor and the like, which have been needed for determining the fuel injection timing in the conventional arrangements, are no longer necessary thus reducing costs, decreasing weight and improving reliability.

When the pulser for use in producing the crank angle reference position signal is provided on the pump driving pulley which drives the fuel injection pump, and the pickup for producing the crank angle reference position signal is provided on the flange for mounting the fuel injection pump, less care is needed for the main body of engine, thus facilitating the application of the present invention.

When the pulser for producing the crank angle reference position signal is provided on the crankshaft, and the pickup for producing the crank angle reference position signal is provided on the cylinder block of the engine, the crank angle adjustment can be dispensed with.

When the pulser for producing the crank angle reference position signal is provided on the fly wheel and the pickup for producing the crank angle reference position signal is provided on the back plate, the cylinder block of the engine or the housing of the transmission, the crank angle adjustment can be dispensed with, as above.

Similarly, when the pulser for producing the crank angle reference position signal is provided on the cam shaft and the pickup for producing the crank angle reference position signal is provided on the cylinder head of the engine, the crank angle adjustment can be dispensed with.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein:

FIG. 2 is a sectional view, partly including a block diagram, showing the general arrangement of a first embodiment of the electronically controlled diesel engine, to which the present invention is applied;

FIG. 8 is a block diagram showing the arrangement of the electronic control unit used in the first embodiment;

DESCRIPTION OF THE PREFERRED EMBODIMENTS

Figure 1:
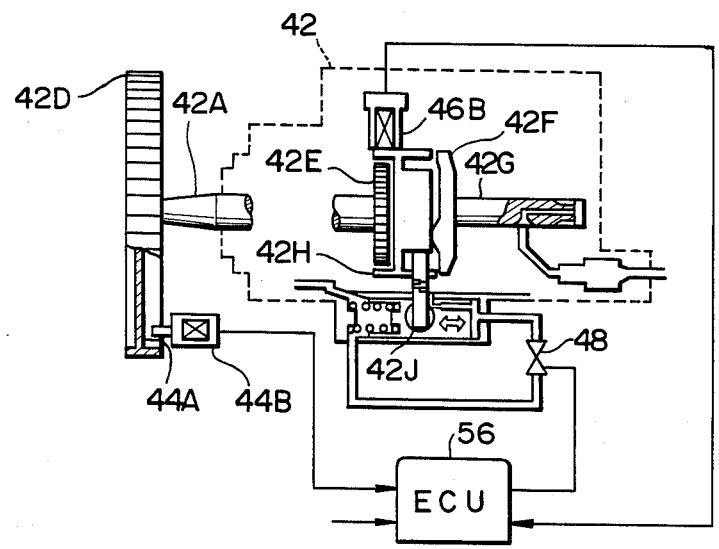
FIG. 1 is a schematic block diagram showing an outline of the system for detecting the fuel injection timing of the diesel engine according to the present invention.

The present invention will be described in detail with reference to the accompanying drawings which illustrate the preferred embodiments of the electronically controlled diesel engine, to which the method of detecting the fuel injection timing according to the present invention is applied.

FIG. 2 shows an embodiment of the present invention in which an intake-air temperature sensor 12 for detecting intake-air temperature is provided at the downstream side of an air cleaner 11. Downstream of the intake-air temperature sensor 12 is a turbo charger 14 including a turbine 14A rotatable by the heat energy of the exhaust gas and a compressor 14B rotatable in operational association with the turbine 14A. The upstream side of the turbine 14A of the turbocharger 14 and the downstream side of the compressor 14B communicate with each other through a waste gate valve 15 to prevent intake-air pressure from being raised excessively high.

Main intake-air throttle valve 18 rotatable non-linearly in operational association with an accelerator pedal 17 is provided in a venturi 16 disposed at the downstream side of the compressor 14B, so as to restrict intake-air quantity during idling and the like. The opening angle Accp of the accelerator pedal 17 (hereinafter referred to as a "accelerator opening") is detected by an accelerator position sensor 20.

An auxiliary intake-air throttle valve 22, the opening of which is controlled by a diaphragm device 24, is provided in parallel with the main intake-air throttle valve 18. A vacuum generated in a vacuum pump (not shown) is supplied to the diaphragm device 24 through a vacuum switching valve (hereinafter referred to as a "VSV") 28 or 30.

Provided at the downstream side of the intake-air throttle valves 18 and 22 is an intake-air pressure sensor 32 for detecting intake-air pressure.

A cylinder head 10A of a diesel engine 10 is provided with an injection nozzle 34 and a glow plug 36, the forward ends of which are located in an engine combustion chamber 10B. Furthermore, provided on a cylinder block 10C of the diesel engine 10 is a water temperature sensor 40 for detecting the temperature of engine cooling water.

Figure 3:
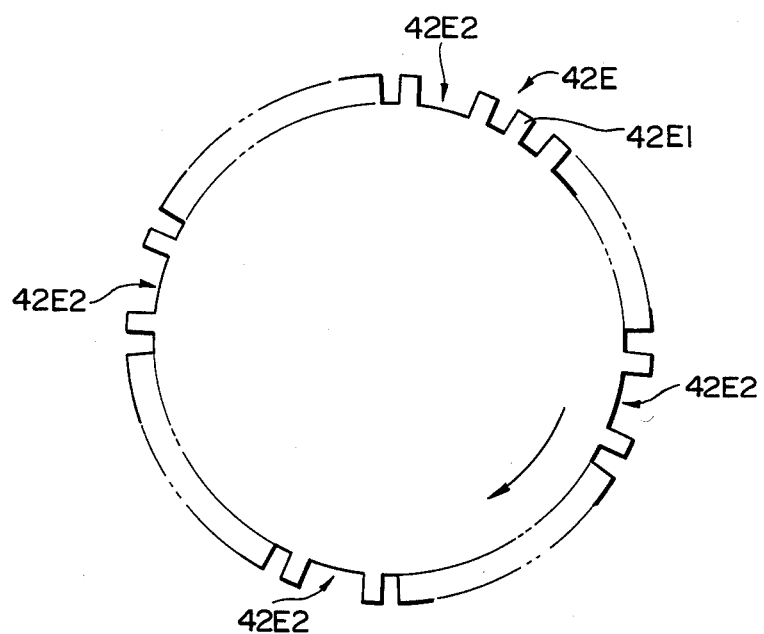
FIG. 3 is a front view showing the shape of the pulser used to produce a pump angle signal in the first embodiment.

Fuel is fed under pressure to the injection nozzle 34 from an injection pump 42. The injection pump 42 includes: a pump driving shaft 42A rotatable in operational association with the rotation of a crankshaft of the diesel engine 10; a feed pump 42B (FIG. 2 shows a state in which the pump has been rotated 90°) secured to the pump driving shaft 42A to pressurize the fuel; a fuel pressure regulating valve 42C for regulating fuel feed pressure; a crank angle reference position sensor (hereinafter referred to as a "CA sensor") 44 for detecting a crank angle reference position of the engine such as top dead center (TDC) from a displacement in rotation of a pump driving pulley 42D which drives the driving shaft 42A; a pump angle sensor (hereinafter referred to as a "PA sensor") 46 including a conventional type pick up 46B for generating pump angle signals (hereinafter referred to as a "PA pick up"), for detecting a pump angle and a missing tooth position corresponding to a predetermined pump angle from the displacement in rotation of a pulser 42E which generates pump angle signals (hereinafter referred to as a "PA pusler") having teeth 42E1 for generating pulse signals and one or several (depending on the number of engine cylinders) missing teeth 42E2 in outer peripheral as shown in FIG. 3; a roller ring 42H for reciprocating a face cam 42F and a plunger 42G and varying the timing thereof; a timer piston 42J (FIG. 2 shows a state in which the timer piston has been rotated 90°) to vary a rotary position of the roller ring 42H; a timing control valve (hereinafter referred to as a "TCV") 48 for controlling the position of the timer piston 42J to control the injection timing; an electromagnetic spill valve 50 for varying fuel relief timing from the plunger 42G through a spill port 42K to control the fuel injection quantity; a fuel cut valve (hereinafter referred to as a "FCV") 52 for cutting the fuel when an abnormality occurs; and a delivery valve 42L for preventing back flow and after-dripping of the fuel.

Figure 4:
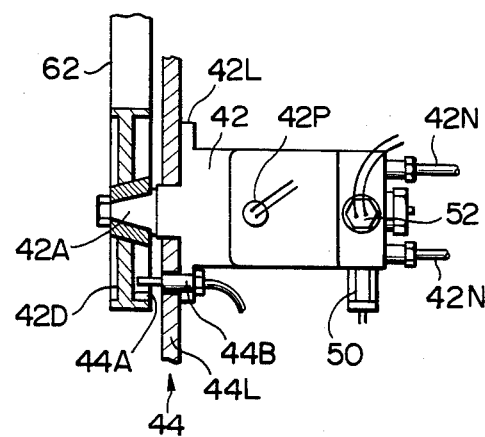
FIG. 4 is a sectional view showing the arrangement of the crank angle reference position sensor used in the first embodiment.

As shown in detail in FIG. 4, the CA sensor 44 includes: a CA pulser 44A in the form of a projection provided on the inner peripheral surface of the pump driving pulley 42D; and a CA pickup 44B provided on a pump flange 42L of the fuel injection pump 42, for producing a crank angle reference position signal (hereinafter referred to as a "CA signal") from the approach of the CA pulser 44A. Additionally, in FIG. 4, 42N is high pressure piping and 42P is a lead wire take-out from the PA sensor 46 (not shown in FIG. 4).

Figure 5:
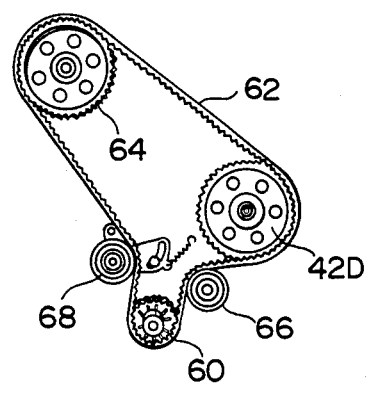
FIG. 5 is a front view showing the driven state of the pump driving pulley used in the first embodiment.

As shown in detail in FIG. 5, the pump driving pulley 42D is driven synchronously with a cam shaft driving pulley 64 by a timing belt 62 guided around a crank pulley 60 secured to the engine crankshaft. Additionally, in FIG. 5, 66 is an idler pulley and 68 a tensioner.

Figure 6:
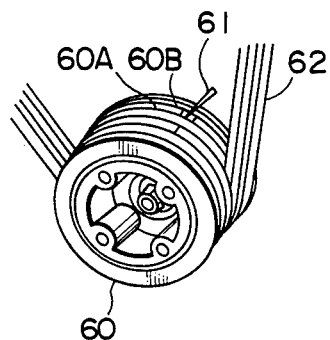
FIG. 6 is a perspective view enlargedly showing the crank pulley used in the first embodiment.

As shown in detail in FIG. 6, the crank pulley 60 is formed thereon with an engine top dead center mark 60A and a crank angle reference position mark (hereinafter referred to as a "CA mark") 60B. Furthermore, a pointer 61 to coincide with the CA mark 60B is provided on the side of the main body of engine.

Figure 7:
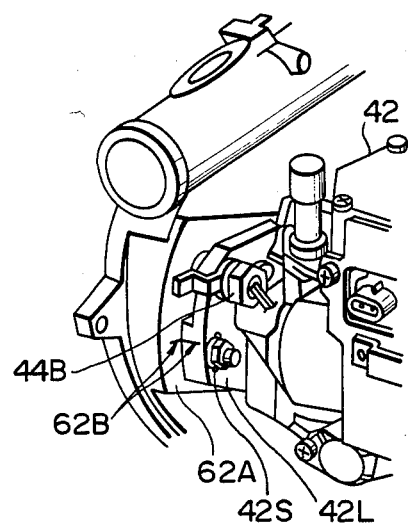
FIG. 7 is a perspective view (enlarged) showing the mounting of the fuel injection pump to the timing belt case in the first embodiment.

As shown in detail in FIG. 7, the CA pickup 44B is mounted so as to be movable within slots 42S formed in the timing belt case 62A and the pump flange 42L of the fuel injection pump 42. Furthermore, notch lines 62B for facilitating the positioning between the pump flange 42L and the timing belt case 62A are provided therebetween.

Outputs from the intake-air temperature sensor 12, the accelerator position sensor 20, the intake-air pressure sensor 32, the water temperature sensor 40, the CA sensor 44, the PA sensor 46, a key switch, an air conditioner switch, a neutral safety switch and a vehicle speed signal are inputted to and processed in an electronic control unit (hereinafter referred to as an "ECU") 56. The VSV 28, 30, the TCV 48, the electromagnetic spill valve 50 and the FCV 52 are controlled by outputs from the ECU 56.

As shown in FIG. 8, the ECU 56 includes: a central processing unit (hereinafter referred to as a "CPU") 56A for performing various calculation processing; a multiplexer (hereinafter referred to as a "MPX") 56H for succesively taking in an output from the water temperature sensor 40, which is inputted through a buffer 56B, an output from the intake air temperature sensor 12, which is inputted through a buffer 56F, a tau correction voltage signal inputted through a buffer 56G, an output from the intake-air pressure sensor 32, which is inputted through a buffer 56D, an output from the accelerator position sensor 20, which is inputted through a buffer 56E, a phase correction voltage signal inputted through a buffer 56F; a tau correction voltage signal inputted through a buffer 56G; an analog-digital converter (hereinafter referred to as an "A/D converter") 56J for converting analog signals outputted from the MPX 56H into digital signals and inputting the same into the CPU 56A; a wave form shaping circuit 56K for wave form shaping an output from the PA sensor 46 and inputting the same into the CPU 56A; a wave form shaping circuit 56L for wave form shaping an output from the CA sensor 44 and inputting the same into the CPU 56A; a buffer 56N for inputting a starter signal into the CPU 56A; a buffer 56P for inputting an air conditioner signal into the CPU 56A; a buffer 56Q for inputting a torque converter signal into the CPU 56A; a driving circuit 56R for driving the FCV 52 in accordance with the result of calculations by the CPU 56A; a driving circuit 56S for driving the TCV 48 in accordance with the result of calculations by the CPU 56A; a driving circuit 56T for driving the electromagnetic spill valve 50 in accordance with the result of calculations by the CPU 56A; a current detecting circuit 56U for detecting the current flowing through the electromagnetic spill valve 50 and feeding-back the same to the driving circuit 56T; a low voltage detecting circuit 56V for detecting a low voltage and inputting the same into the driving circuit 56T; a driving circuit 56W for outputting a self diagnosis signal (hereinafter referred to as a "diag signal") in accordance with the result of calculations by the CPU 56A; and a driving circuit 56X for operating a warning lamp in accordance with the result of calculations by the CPU 56A.

The aforesaid phase correction voltage signal is the signal for correcting any phase difference occuring when the CA sensor 44 is mounted. Furthermore, the aforesaid tau correction voltage signal is the signal for correcting any deviation in responsiveness due to differences between individual parts in the injection pump 42.

Description will hereunder be given of the operation of one embodiment.

First, in mounting the CA pickup 44B to the pump flange 42L, a timing light is turned on in response to an output signal from the CA sensor 44 in the same manner as in a gasoline engine, and the position of the CA pickup 44B is adjusted and fixed such that the pointer 61 coincides with the CA mark 60B.

Figure 9:
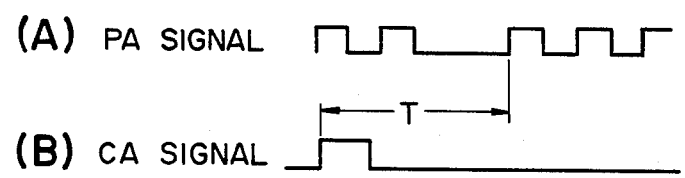
FIG. 9A and 9B are charts showing the method, by which the fuel injection timing is determined from the pump angle signal and the crank angle reference position signal.
Figure 13:
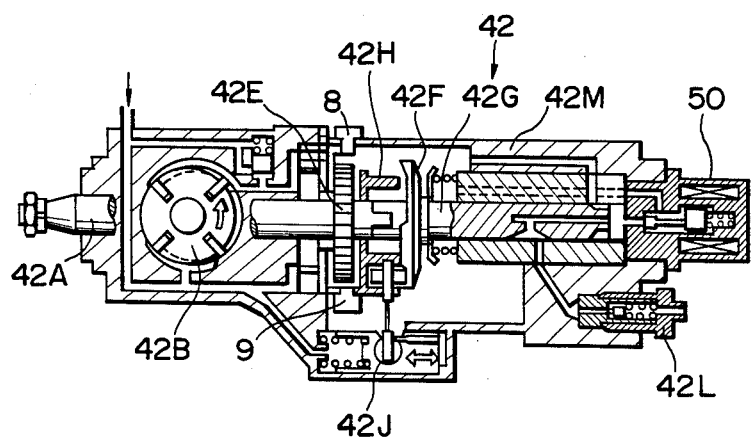
FIG. 13 is a sectional view showing an example of a fuel injection pump, to which the conventional method of detecting the fuel injection timing is applied.

Detection of the fuel injection timing by outputs from the PA sensor 46 and the CA sensor 44 including the CA pickup 44B (fixed in the manner described above) is performed in the following manner. The CA sensor 44 produces a series of pulses for every two turns of the crankshaft through use of the CA pulser 44A on the pump driving pulley 42D which is driven by the timing belt 62. The CA signal outputted from the CA sensor 44 indicates crankangle reference position of the engine. The PA sensor 46 also produces a series of pulses for every one-fourth turn of the pump driving shaft 42A. The PA signal outputted from the PA sensor 46 indicates the missing tooth position in the injection pump 42, i.e. the position of the roller ring 42H. As shown in FIG. 9, there is a phase difference T between the CA signal and the PA signal. When the timer piston 42J moves, the roller ring 42H connected to the timer piston 42J rotates relative to the face cam 42F. So, a riding timing of the roller ring 42H on the face cam 42F which corresponds to a start timing of fuel pressurizing by the plunger 42G also changes. The injection timing of the fuel is decided in accordance with the start timing of fuel pressurizing. So, the above phase difference T indicates the fuel injection timing with regard to the reference position (TDC for example) of the engine.

More specifically, when the timer piston 42J moves due to the on-off duty ratio of the control signal of the TCV 48 and the roller ring 42H moves to the side of advance angle, the PA pickup 46B on the roller ring 42H moves to the side of advance angle to vary the phase difference T. As a consequence, this phase difference T is measured by the ECU 56, so that the position of the timer piston, i.e., the fuel injection timing can be calculated. Furthermore, the engine speed can be calculated from the PA signal.

In this embodiment, the CA pulser 44A is mounted on the pump driving pulley 42D and the CA pickup 44B is mounted on the pump flange 42L, so that the injection pump 42 can be assembled onto the engine without accurate measuring and the injection timing can be determined with more simplified adjustment than in the conventional case. Furthermore, no care is needed for the main body of engine, so that the application of the present invention is facilitated.

However, the position, where the CA sensor 44 is mounted, need not necessarily be limited to the arrangement described above. For example, if the CA sensor 44 is mounted on the main body of engine, the crank angle adjustment may be dispensed with.

Figure 10:
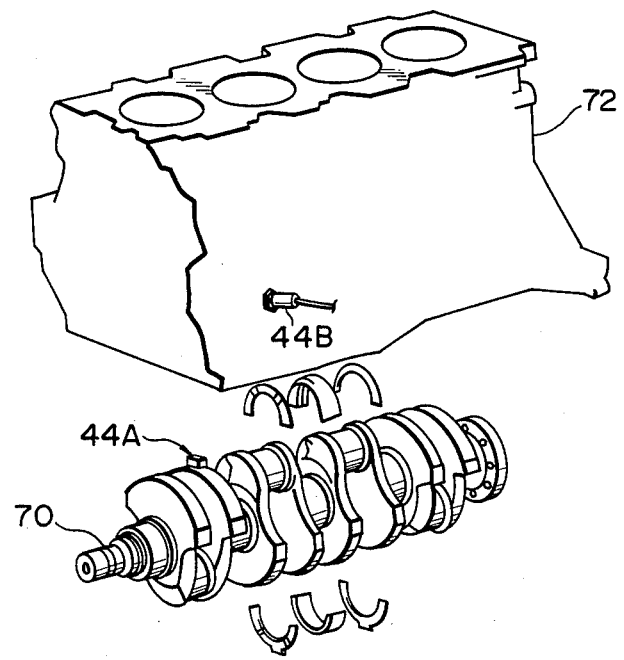
FIG. 10 is a disassembled perspective view showing the mounting of the crank angle reference position sensor in a second embodiment of the present invention.

Accordingly, in the second embodiment, which is shown in FIG. 10, the CA pulser 44A is mounted on the crankshaft 70 and the CA pickup 44B is mounted on the cylinder block 72 of the engine.

Figure 11:
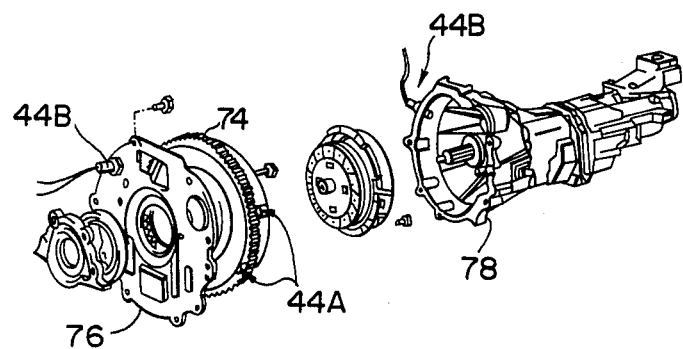
FIG. 11 is a disassembled perspective view showing the mounting of the crank angle reference position sensor in a third embodiment of the present invention.

In a third embodiment, which is shown in FIG. 11, the CA pulser 44A is mounted on the outer peripheral surface or on a side surface near the outer periphery of the fly wheel 74 of the engine, and the CA pickup 44B is mounted on a back plate 76 of the engine or the housing 78 of the transmission.

Figure 12:
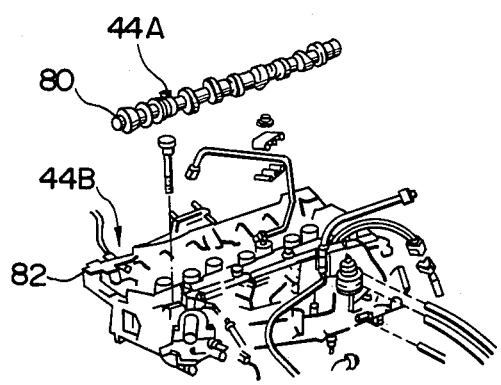
FIG. 12 is a disassembled perspective view showing the mounting of the crank angle reference position sensor in a fourth embodiment of the present invention.

Finally, in a fourth embodiment, which is shown in FIG. 12, the CA pulser 44A is mounted on the cam shaft 80 and the CA pickup 44B is mounted on the cylinder head 82 of the engine.

In each of these second through fourth embodiments, adjustment of the position of the CA pickup 44B for adjusting the reference position may be dispensed with.

It is to be understood that while the foregoing illustrates the preferred embodiments and method of the present invention, other variations are possible. All such variations as would be obvious to one skilled in this art are intended to be included within the scope of the invention defined by the following claims.

What is claimed is:

1. A method of detecting fuel injection timing in a diesel engine having a fuel injection pump, wherein a member is provided for converting rotary motion of a pump driving shaft into reciprocating motion of a fuel pressure-feed plunger, said converting member being rotatable relative to said pump driving shaft to vary the starting position of the compression stroke of said fuel pressure-feed plunger so as to control fuel injection timing, comprising the steps of:

(a) directly detecting a crank angle reference position which corresponds to a specific crank angle from rotation of a member rotatable in association with rotation of said engine, which is disposed outside said fuel injection pump;

(b) detecting a predetermined pump angle from rotation of said converting member relative to said pump driving shaft, in said fuel injection pump; and (c) determining fuel injection timing from the phase difference between the crank angle reference position and the predetermined pump angle.

2. A system for detecting a fuel injection timing in a diesel engine provided with a fuel injection pump, wherein a converting member is provided for converting rotary motion of a pump driving shaft into reciprocating motion of a fuel pressure-feed plunger, said converting member being rotatable relative to said pump driving shaft to vary the starting position of the compression stroke of said fuel pressure-feed plunger so as to control fuel injection timing, comprising:

- a pulser provided on a member directly rotatable in association with the engine rotation and disposed outside the fuel injection pump, for use in producing a crank angle reference position signal, which position corresponds to a specific crank angle;
- a pickup for producing the crank angle reference position signal in response to the approach of said pulser;
- a pulser provided on a member rotatable in association with said pump driving shaft in the fuel injection pump, for use in producing a pump angle signal; and
- a pickup provided on said converting member in the fuel injection pump, for producing at least a predetermined pump angle signal in response to the approach of a predetermined position on said pulser; so that fuel injection timing can be determined from the phase difference between the crank angle reference position signal and the predetermined pump angle signal.

3. The system for detecting fuel injection timing as set forth in claim 2, wherein the pulser used in producing a crank angle reference position signal is mounted on a pump driving pulley for driving said fuel injection pump, and said pickup for producing a crank angle reference position signal is mounted on a flange for mounting said fuel injection pump.

4. The system for detecting a fuel injection timing as set forth in claim 3, wherein the pulser used in producing a crank angle reference position signal is a projection formed on the inner peripheral surface of said pump driving pulley.

5. The system for detecting fuel injection timing as set forth in claim 3, wherein said pump driving pulley is driven by a timing belt guided around a crank pulley having a crank angle reference position mark formed thereon, and a pointer to coincide with said crank angle reference position mark during adjustment is provided on the side of the main body of said engine.

6. The system for detecting fuel injection timing as set forth in claim 3, wherein said pickup for producing a crank angle reference position signal is movably mounted within slots formed in a timing belt case and said flange for mounting the pump, and notch lines for facilitating the positioning of the pickup between said pump flange and said timing belt case are provided.

7. The system for detecting fuel injection timing as set forth in claim 2, wherein said pulser for use in producing a crank angle reference position signal is mounted on a crankshaft, and said pickup for producing a crank angle reference position signal is mounted on a cylinder block of said engine.

8. The system for detecting fuel injection timing as set forth in claim 2, wherein said pulser for use in producing a crank angle reference position signal is mounted on a side surface of a fly wheel near the outer periphery of the fly wheel, and said pickup for producing a crank angle reference position signal is mounted on a back plate of said engine.

9. The system for detecting fuel injection timing as set forth in claim 2, wherein said pulser for use in producing a crank angle reference position signal is mounted on the outer periphery of a fly wheel, and said pickup for producing a crank angle reference position signal is mounted on a housing of a transmission.

10. The system for detecting fuel injection timing as set forth in claim 2, wherein said pulser for use in producing a crank angle reference position signal is mounted on a cam shaft, and said pickup for producing a crank angle reference position signal is mounted on a cylinder head of said engine.

11. A system for detecting a fuel injection timing in a diesel engine provided with a fuel injection pump, wherein a converting member is provided for converting rotary motion of a pump driving shaft into reciprocating motion of a fuel pressure-feed plunger, said converting member being rotatable relative to said pump driving shaft to vary the starting position of the compression stroke of said fuel pressure-feed plunger so as to control fuel injection timing, comprising:

- a pulser provided on a crankshaft of said engine, for use in producing a crank angle reference position signal, which position corresponds to a specific crank angle;
- a pickup provided on a cylinder block of said engine, for producing the crank angle reference position in response to the approach of said pulser;
- a pulser provided on a member rotatable in association with said pump driving shaft in the fuel injection pump, for use in producing a pump angle signal; and
- a pickup provided on said converting member in the fuel injection pump, for producing at least a predetermined pump angle signal in response to the approach of a predetermined position on said pulser; so that fuel injection timing can be determined from the phase difference between the crank angle reference position signal and the predetermined pump angle signal.

12. The system for detecting fuel injection timing as set forth in claim 11, wherein said pulser used in producing the crank angle reference position signal is mounted on a counter weight of said crankshaft.

13. A system for detecting a fuel injection timing in a diesel engine provided with a fuel injection pump, wherein a converting member is provided for converting rotary motion of a pump driving shaft into reciprocating motion of a fuel pressure-feed plunger, said converting member being rotatable relative to said pump driving shaft to vary the starting position of the compression stroke of said fuel pressure-feed plunger so as to control fuel injection timing, comprising:

- a pulser provided on a side surface of a fly wheel of said engine near an outer periphery of the fly wheel, for use in producing a crank angle reference position signal, which position corresponds to a specific crank angle;
- a pickup provided on a back plate of said engine, for producing the crank angle reference position signal in response to the approach of said pulser;

a pulser provided on a member rotatable in association with said pump driving shaft in the fuel injection pump, for use in producing a pump angle signal; and a pickup provided on said converting member in the fuel injection pump, for producing at least a predetermined pump angle signal in response to the approach of a predetermined position on said pulser; so that fuel injection timing can be determined from the phase difference between the crank angle reference position signal and the predetermined pump angle signal.

14. A system for detecting a fuel injection timing in a diesel engine provided with a fuel injection pump, wherein a converting member is provided for converting rotary motion of a pump driving shaft into reciprocating motion of a fuel pressure-feed plunger, said converting member being rotatable relative to said pump driving shaft to vary the starting position of the compression stroke of said fuel pressure-feed plunger so as to control fuel injection timing, comprising:

a pulser provided on an outer periphery of a fly wheel of said engine, for use in producing a crank angle reference position signal, which position corresponds to a specific crank angle;

a pickup provided on a housing of a transmission, for producing the crank angle reference position signal in response to the approach of said pulser;

a pulser provided on a member rotatable in association with said pump driving shaft in the fuel injection pump, for use in producing a pump angle signal; and a pickup provided on said converting member in the fuel injection pump, for producing at least a predetermined pump angle signal in response to the of a predetermined position on said pulser; so that fuel injection timing can be determined from the phase difference between the crank angle reference position signal and the predetermined pump angle signal.

15. A system for detecting a fuel injection timing in a diesel engine provided with a fuel injection pump, wherein a converting member is provided for converting rotary motion of a pump driving shaft into reciprocating motion of a fuel pressure-feed plunger, said converting member being rotatable relative to said pump driving shaft to vary the starting position of the comrpession stroke of said fuel pressure-feed plunger so as to control fuel injection timing, comprising:

a pulser provided on a cam shaft of said engine, for use in producing a crank angle reference position signal, which position corresponds to a specific crank angle;

a pickup provided on a cylinder head of said engine, for producing the crank angle reference position signal in response to the approach of said pulser;

a pulser provided on a member rotatable in association with said pump driving shaft in the fuel injection pump, for use in producing a pump angle signal; and a pickup provided on said converting member in the fuel injection pump, for producing at least a predetermined pump angle signal in response to the approach of a predetermined position on said pulser; so that fuel injection timing can be determined from the phase difference between the crank angle reference position signal and the predetermined pump angle signal.

16. A system for detecting a fuel injection timing in a diesel engine provided with a fuel injection pump, wherein a converting member is provided for converting rotary motion of a pump driving shaft into reciprocating motion of a fuel pressure-feed plunger, said converting member being rotatable relative to said pump driving shaft to vary the starting position of the compression stroke of said fuel pressure-feed plunger so as to control fuel injection timing, comprising:

a pulser formed by a projection provided on an inner peripheral surface of a pump driving pulley for driving said fuel injection pump, for use in producing a crank angle reference position signal, which position corresponds to a specific crank angle, said pump driving pulley being driven by a timing belt guided around a crank pulley having a crank angle reference position mark formed thereon;

a pointer provided on a side of a main body of said engine to coincide with said crank angle reference position mark during adjustment;

a pickup movably provided within slots formed in a timing belt case and a flange for mounting said fuel injection pump, for producing the crank angle reference position signal in response to the approach of said pulser;

notch lines for facilitating the positioning of the pickup between said pump flange and said timing belt case;

a pulser provided on a member rotatable in association with said pump driving shaft in the fuel injection pump, for use in producing a pump angle signal; and a pickup provided on said converting member in the fuel injection pump, for producing at least a predetermined pump angle signal in response to the approach of a predetermined position on said pulser; so that fuel injection timing can be determined from the phase difference between the crank angle reference position signal and the predetermined pump angle signal.

* * * * *